E. WALKER.
CIGAR CUTTER.
APPLICATION FILED MAY 11, 1904.
962,481.
Patented June 28, 1910.
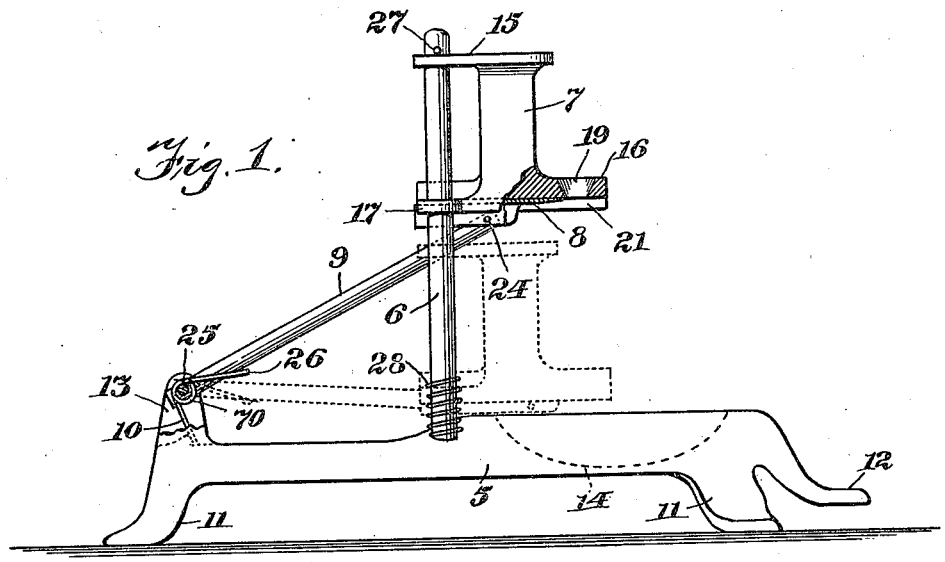
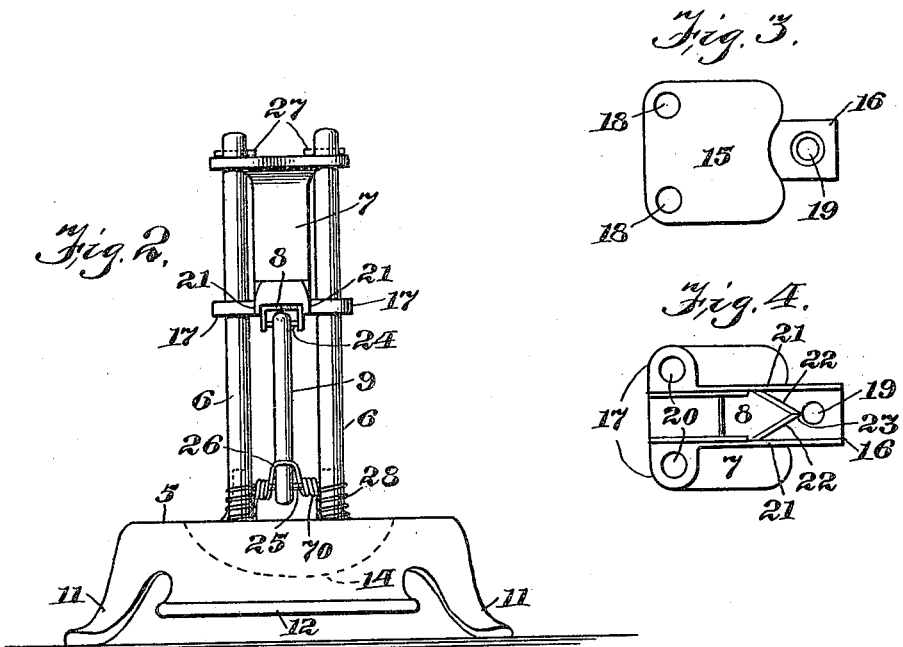
WITNESSES:
Robert Head
V. E. Nichols
INVENTOR:
Edwin Walker;
BY
Griffin Bernhard & Cavanagh
ATTORNEYS

UNITED STATES PATENT OFFICE.

EDWIN WALKER, OF ERIE, PENNSYLVANIA, ASSIGNOR TO THE BRUNHOFF MANUFACTURING COMPANY, OF CINCINNATI, OHIO.

CIGAR-CUTTER.

962,481. Specification of Letters Patent. Patented June 28, 1910.

Application filed May 11, 1904. Serial No. 207,493.

*To all whom it may concern:*

Be it known that I, EDWIN WALKER, a citizen of the United States, residing at Erie, in the county of Erie and State of Pennsylvania, have invented certain new and useful Improvements in Cigar-Cutters; and I do hereby declare the following to be a full, clear, and exact description of the same.

My invention relates to improvements in cigar cutters of that class wherein a movable cutter head is combined with a knife or blade adapted to travel with said cutter head and to have movement therein.

In the present invention I seek to provide an improved construction which is well adapted for advertising purposes and embraces a comparatively small number of parts, each of simple form and adapted to be made and assembled easily and quickly, thus contributing to economy in manufacture. The cutter head is of such form that a cigar may be placed therein, and moved therewith, so as to avoid breaking the wrapper or the cigar during the operation of cutting or perforating the tip. Furthermore, in one embodiment of the invention this cutter head provides a rest for the operator's fingers, to overcome all possibility of injury to the fingers; and said cutter head also provides means for supporting or carrying a knife, blade or cutter so that the latter may have movement imparted thereto relative to the tip-receiving opening of said head.

The broad feature of this invention resides in a novel form of operating mechanism whereby the cutter head is capable of any up and down movement and the knife or blade has a traversing movement imparted thereto positively on the travel of the cutter-head.

In cutting or perforating a cigar, the natural tendency is to place it, tip downward, in an upright position relative to a cutter device, and to move it downwardly in a vertical path, at which time the tip is cut or perforated, such operations being carried out with a minimum liability of breaking the cigar or its wrapper. My present device is designed to carry out these operations to the best advantage, and in the cutter device to be hereinafter described, the cutter head is mounted for movement in a vertical path, and a single arm is provided for positively operating the blade or knife to impart a traversing movement thereto, said arm being spring-actuated so as to sustain the head and the blade normally in a raised position and to hold the blade in such relation to the tip-opening as to uncover the latter.

Another part of my invention resides in the employment of a novel form of cutter which is constructed to secure a shearing action on the cigar tip. This cutter is provided with two cutting edges which converge toward a central point, and the cutter is mounted to have a traversing movement so that the point of the blade will move across the center of the tip opening, thus making the point penetrate the cigar first and thereafter, on the continued movement of the cutter, bring the two cutting edges into service with shearing or sliding cuts in reversely inclined directions. This peculiar action makes the cutter operate so cleanly and easily as to be almost imperceptible to the operator, and the cut is so thorough and quick that the liability of breaking the wrapper is wholly overcome.

Further objects and advantages of the invention will appear in the course of the subjoined description, and the actual scope of the invention will be defined by the annexed claims.

Reference is to be had to the accompanying drawings, forming a part of the specification, and in which like characters of reference are used to indicate corresponding parts in all the figures.

Figure 1 is a side elevation, partly broken away and in section, of a cigar cutter embodying my invention, the dotted lines showing a depressed position of the parts for cutting a tip from a cigar. Fig. 2 is a front elevation with the parts in their normal raised position. Fig. 3 is a plan view of the up and down movable cutter head detached from the cutter device, and Fig. 4 is an inverted bottom plan view of the cutter head, illustrating a preferred form of knife or blade.

In the form of cigar cutter shown by the drawings, I employ a base 5, an upright guide 6, a cutter head 7, a knife or blade 8, an arm 9 and a spring 10.

The base 5 is shown as having depending feet 11, a shelf 12 at one end, and one or more upstanding lugs 13 at the opposite end, but I do not desire to restrict myself to the particular form of base shown because I reserve the right to employ any kind of base, either ornamental or plain, as may be found desirable or expedient. The base is furthermore equipped with a well or depression 14, shown by dotted lines in Figs. 1 and 2, the same forming a receptacle for the cigar clippings, but if desired the base may have an opening in which is adapted to be placed a cup, the latter being removable from the base. Furthermore, the base may serve as a means for supporting suitable advertising matter, the same being applied to or made as a part of the base, but as these details practically form no part of my invention I have not considered it necessary to illustrate the same herein.

The upright guide 6 may be of any suitable character, but as shown I employ two posts, either solid or tubular, and attached to the base 5 in any suitable way, and arranged preferably in vertical positions and in parallel relation to each other, but it is evident that any other form of upright guide may be employed for supporting the cutter head 7 in a way to permit the latter to have a slidable or reciprocatory travel in an up and down direction with respect to the base.

The cutter head 7 is shown as being cast in a single piece of metal, and it comprises a body portion, a top portion 15, a flange 16 projecting forward from the front side thereof, and lugs 17 projecting rearwardly at the lower rear part of the body portion. The top portion 15 of the cutter head is in the form of a plate, and said plate is provided with guide openings 18, see Fig. 3. This body portion or plate 15 of the cutter head constitutes a finger rest arranged in a horizontal plane above the cutter devices, presently described, whereby the operator may place the fingers on said rest for the purpose of applying pressure to the cutter head in order to depress the latter in the operation of cutting or perforating the cigar tip. The flange 16 is at the lower or bottom portion of the cutter head, and it projects a suitable distance beyond the front face of the cutter head and the front edge of the finger rest 15. Said flange 16 is shown as having a tip-receiving opening 19, which lies in a plane in front of the body of the cutter head and is a conical form, see Fig. 1, whereby a cigar may be placed, tip downward, in the opening 19 and assume a position in front of the cutter head. The lugs 17 project from the rear side of the cutter head and they are provided with openings 20 which aline vertically with the openings 18 in the top portion or finger rest of the cutter head, thus making provision for the application of the cutter head to the guide posts 6 by simply sliding the cutter head over said posts, the latter fitting loosely in the alined opening 20, 18 of said cutter head. The employment of a plurality of posts to fit in the openings of the cutter head affords efficient means for limiting the cutter head to movement in a rectilinear path and at the same time said posts prevent tipping of the cutter sidewise.

In connection with the form of cutter head heretofore described, I employ a suitable form of cutter or perforator device, and means for operating said device on the up and down travel of the cutter head. In the form of construction shown by the drawings, the cutter head is constructed for the reception of an endwise movable or slidable knife 8, and, as shown, the bottom or under face of the cutter head is provided with a guide way 21, the same being formed by flanges, which extend across the under face of the cutter head and the flange 16. The detailed form of the guide, however, is immaterial.

The blade 8 is fitted snugly in the guide 21 for endwise movement therein in a rectilinear path, said blade being capable of up and down movement with the cutter head and also capable of an independent traversing movement across the tip opening 19 of said cutter head. This blade in the preferred form of construction is shown as having two cutting edges 22, which are inclined reversely to each other or which may be said to converge toward an entrance point 23. The cutter blade is constructed and guided to bring the entrance point 23 thereof in such position that it will slide across the center of the tip opening 19, whereby in the operation of cutting a tip from a cigar the point 23 of the blade first penetrates the tobacco and thereafter the edges 22, operating equally on the tip of the cigar in a way to cut the latter with a shearing action or a sliding cut, thus quickly and easily severing the tip without liability of breaking the point or the wrapper of the cigar.

As a preferred means for operating the knife or blade on the up and down movement of the cutter head, I employ a single arm 9, which is shown as having a pivotal connection at 24 with the cutter blade 8. This arm 9 is pivoted at the other end by a pin 25, which is secured in the lugs 13 at the rear of the base, said arm thus having pivotal connection at its respective ends with the cutter and the base. On the downward movement of the cutter head and the cigar therewith, the arm 9 swings on the pin 25 and pushes forward on the cutter 8 so as to move the latter in a rectilinear path across the tip-receiving opening 19, thus operating the blade 8 in a positive manner on the downward movement of said blade with the cutter head.

Suitable means are provided for holding the cutter head, the blade and the arm 9 in raised positions so as to be ready for operation, and as a suitable means for securing this end I employ a spring 10. As shown, the spring 10 is coiled around the pin 25 in a way to produce a loop 26, which fits beneath the arm 9 and is arranged to act in upward direction thereon. I do not desire, however, to limit myself to this specific form and arrangement of the spring 10, because I am aware that other forms of springs may be used, and if desired the equivalent of the spring may be employed for holding the parts in their raised positions. The upward movement of the cutter head on the guide 6 is limited by the employment of a suitable form of stop 27, and the downward movement of the cutter head on the guide is cushioned by the employment of one or more buffer springs 28.

The operation and advantages of my invention will be readily understood from the foregoing description taken in connection with the drawings. The operator places a cigar, tip downward, into the opening 19, and the fingers of the hand rest on the top portion 15 of the cutter head. Pressure is applied downwardly directly to the cutter head, the cigar being held firmly in place by the hand and by the opening 19. On the downward movement of the cutter head, the arm 9 pushes the cutter across the plane of the opening 19, and the active edges of the blade 8 cut the tip easily and cleanly from the cigar, the cutter operating so easily that resistance of the cigar and the passage of the blade is not perceptible. The clipping drops into the receptacle 14, and on removing the pressure from the cutter head the spring 10 becomes effective in raising the cutter head, the blade 8 and the arm 9 to their normal positions, the arm 9 drawing the blade 8 back to a position where the tip opening 19 is uncovered.

Changes in the form, size, proportion and minor details of construction may be made by a skilled mechanic without departing from the spirit or sacrificing the advantages of my invention. I, therefore, reserve the right to make such modifications and alterations as fairly fall within the scope of the invention as defined by the annexed claims.

Having thus fully described my invention, what I claim as new and desire to secure by Letters Patent is:

1. In a cigar cutter, a cutter head having a tip opening, and a rest for a cigar-cutter above said tip opening, a guide to which the cutter head is fitted for slidable movement, a cutter movable with the cutter head, and in a rectilinear path relative to the tip opening thereof, and means for operating said cutter upon the depression of the head.

2. In a cigar cutter, a vertical guide, a cutter head provided with a tip opening and fitted to said guide for slidable movement relative thereto, said cutter head being, at all points of its slidable travel, positioned externally to said vertical guide, a cutter slidable with said head and movable in a rectilinear path relative to said tip opening, and an arm for operating said cutter during its travel with said head, said arm being movable with the cutter head.

3. In a cigar cutter, a base, exposed guiding means extending upwardly from said base, a cutter head coöperating with said guiding means, said cutter head having a tip opening and provided, also, with means positioned above the walls of the tip opening for affording a rest for a cigar, cutting means movable with said cutter head, and a single arm coöperating with the cutting means and the cutter head.

4. In a cigar cutter, a cutter head having a tip opening, and a finger rest in a horizontal plane above said tip-opening, guiding means for limiting said cutter head to slidable movement, a single cutter coöperating with the cutter head, and movable in a rectilinear path relative to the tip opening, and a single pivoted arm for giving sliding movement to the cutter and operating to hold the cutter head normally in a raised position.

5. In a cigar cutter, a cutter mechanism including a cutter head and a knife mounted for slidable movement in an up and down direction, said cutter head having a tip opening, and the knife having a sliding movement in a rectilinear path with respect to said tip opening, a guide on which the cutter head is adapted to slide, and a single arm operatively related to the cutter for imparting sliding movement thereto on the depression of the cutter head, said arm being pivoted at a point outside of the cutter head guide.

6. In a device of the class described, an upright guide, a cutter head having one side thereof fitted slidably on the guide and provided in an exposed side with a tip opening, cutter mechanism, and means operable by the travel of the cutter head for actuating the cutter mechanism.

7. In a device of the class described, a base, an upright guide, an exposed cutter head having a rear side fitted slidably on the guide and provided in an exposed front side with a vertical tip-opening, a cutter, and a pivoted arm for operating said cutter on the depression of the cutter head.

8. In a device of the class described, a base, exposed guide posts thereon, an exposed cutter head slidable on the guide posts, a cutter, and a pivoted arm for operating said cutter.

9. In a cigar-cutter, a non-pivoted cutter-head provided with a tip opening and with a channel below said tip opening, means for limiting the cutter-head to slidable movement in a rectilinear path, a cutter limited by said guide channel to movement in a rectilinear path relative to the tip opening, and a single arm pivoted at one end to said cutter, and operating to impart movement to the cutter-head relative to said guiding means therefor, the other end of said arm being pivoted at a point outside of said guiding means for the cutter-head.

10. In a cigar cutter, a base, an upright thereon, a non-pivoted cutter-head slidable on said upright, a cutter limited to movement in a rectilinear path on said head, and a single arm connected to the cutter and pivoted to the base at a point outside of the upright.

11. In a cigar cutter, a base, an upright guide thereon, a slidable cutter-head provided with a tip hole and fitted to said guide for movement bodily thereon, a cutter movable in a rectilinear path relative to the tip hole, and an exposed spring-actuated arm coöperating with the cutter and pivoted to the base.

12. In a cigar-cutter, a base, a guide projecting upwardly from said base, a cutter-head slidable on said guide and arranged exteriorly thereto, said cutter-head being provided with a tip-opening and with a pressure surface above said tip-opening, the cutter coöperating with said cutter-head, a pivoted arm for operating the cutter on the depression of the cutter-head, and means for holding said cutter-head in a raised position.

13. In a cigar cutter, a slidable cutter head, guide mechanism therefor, a cutter, and a spring-actuated arm operating to hold the cutter normally in engagement with the cutter head, said cutter and the arm being capable of separation from the cutter head by a lateral movement relative to said cutter head, thereby enabling the cutter to be readily sharpened without dismantling the device.

14. In a cigar cutter, a reciprocating cutter head having a tip opening, and also provided with a rest for a cigar above said tip opening, guiding mechanism for said cutter head and extending above said tip opening, and cutting mechanism coöperating with and actuated by the movement of said cutter head.

15. In a cigar-cutter, a reciprocating cutter-head comprising a body portion having on one part thereof a tip-opening and on another part a pressure surface located above said tip-opening, guiding mechanism for said cutter-head, and cutting mechanism coöperating with and actuated by the movement of said cutter-head.

16. In a cigar-cutter and guide, a cutter-head fitted to said guide for reciprocating movement thereon, said cutter-head having a tip-opening and a rest for a cigar located above said tip-opening, and a reciprocating cutter adapted to be operated by the reciprocating travel of the cutter-head.

17. In a device of the class described, a cutter-head provided at its lower part with a tip opening and at its upper part with a pressure surface, said tip opening and the pressure surface being in different horizontal planes, and a cutter mechanism operable by the depression of the cutter-head.

18. In a device of the class described, a cutter-head provided with a tip-opening and with a rest for a cigar, said rest being above the horizontal plane of the tip-opening, and cutting mechanism coöperating with said head and adapted to be operated by the movement thereof.

19. In a device of the class described, a plurality of stationary guide-posts, an exposed cutter-head engaging at a plurality of points with said guide posts and free to slide bodily thereon, cutting mechanism coöperating with the cutter head, and a pivoted arm for operating said cutting mechanism.

20. In a device of the class described, a guide, a non-pivoted cutter-head, free to slide bodily on said guide, a cutter coöperating with said cutter-head, a pivoted arm for sustaining said head normally in a raised position, and independent means for cushioning the downward bodily movement of the cutter-head.

21. In a device of the class described, a stationary guide, a cutter-head slidable on said guide, a normally inactive cushion spring in the path of said head, a cutter slidable on the cutter-head, and an exposed spring actuated arm coöperating with the cutter and the cutter-head.

22. In a device of the class described, a plurality of guide posts, a cutter-head slidable thereon, cushion springs held by the posts in the path of said cutter-head, a cutter, and means independent of said cushion springs for sustaining the cutter-head normally raised.

23. In a device of the class described, a non-pivoted cutter-head, a guide on which the cutter-head is free to have slidable movement, a cushion held by said guide in the path of said head, means for maintaining the cutter-head normally raised, and a cutter coöperating with said head.

24. In a device of the class described, an upright guide, an exposed cutter-head operating on said upright guide and provided with a tip-opening, and also provided in its bottom face with a guide channel, a pivoted arm, and a cutter sliding in the guide channel and pivoted to said arm for operation thereby, said cutter being withdrawable from the cutter-head by a lateral movement, whereby the cutter and the cutter-head may be readily separated.

In testimony whereof I have signed my name to this specification in the presence of two subscribing witnesses.

EDWIN WALKER.

Witnesses:
JAS. H. GRIFFIN,
V. E. NICHOLS.